(12) United States Patent
Zhang et al.

(10) Patent No.: US 9,137,039 B2
(45) Date of Patent: Sep. 15, 2015

(54) ACCESSING A COMMUNICATION MEDIA USING BOTH A CONTENTION PERIOD AND A POLLING PERIOD

(75) Inventors: Zhi Gang Zhang, Beijing (CN); Lin Xiang Cheng, Beijing (CN); Xian Lei Wang, Beijing (CN)

(73) Assignee: Thomson Licensing (FR)

( * ) Notice: Subject to any disclaimer, the term of this patent is extended or adjusted under 35 U.S.C. 154(b) by 190 days.

(21) Appl. No.: 12/455,547

(22) Filed: Jun. 3, 2009

(65) Prior Publication Data
US 2010/0034214 A1    Feb. 11, 2010

(30) Foreign Application Priority Data
Jun. 26, 2008   (EP) ..................................... 08305334

(51) Int. Cl.
*H04L 12/403* (2006.01)
*H04L 12/64* (2006.01)
*H04L 12/413* (2006.01)

(52) U.S. Cl.
CPC ........ *H04L 12/4035* (2013.01); *H04L 12/6418* (2013.01); *H04L 12/4135* (2013.01)

(58) Field of Classification Search
USPC ........................... 370/346–348, 443, 445, 449
See application file for complete search history.

(56) References Cited

U.S. PATENT DOCUMENTS

| | | | |
|---|---|---|---|
| 4,774,707 A * | 9/1988 | Raychaudhuri | 370/447 |
| 5,231,634 A * | 7/1993 | Giles et al. | 370/348 |
| 6,339,585 B1 * | 1/2002 | Hulyalkar et al. | 370/226 |
| 6,990,116 B1 | 1/2006 | Young et al. | |
| 7,031,287 B1 * | 4/2006 | Ho et al. | 370/338 |
| 7,187,668 B2 * | 3/2007 | Kandala | 370/338 |
| 2002/0122409 A1 * | 9/2002 | Kandala | 370/348 |
| 2002/0161913 A1 * | 10/2002 | Gonzalez et al. | 709/233 |

(Continued)

FOREIGN PATENT DOCUMENTS

| | | |
|---|---|---|
| CN | 1535518 | 10/2004 |
| EP | 1615395 | 1/2006 |

(Continued)

OTHER PUBLICATIONS

Jung-Tsan Lin et al. "Bandwidth Admission control mechanism for supporting QoS over DOCSIS 1.1 HFC networks" NETWORKS, 2002, ICON 2002, 10th IEEE International Conference on Aug. 27-30, 2002, Piscataway, NJ, USA, IEEE, Aug. 27, 2002 pp. 9-13 XP010603590.

(Continued)

*Primary Examiner* — Benjamin Lamont
(74) *Attorney, Agent, or Firm* — Jack Schwartz & Associates, PLLC

(57) ABSTRACT

The present invention provides an access point device, a communication unit and a method for access to a communication media in a communication network. The access point comprises a communication interface for exchanging data with a plurality of communication units in the communication network via the communication media; and a processor for receiving a media access request message in a contention mode from at least one communication unit of the plurality of communication units via the communication interface; and polling the at least one communication unit by assigning a media access duration to each of the at least one communication unit according to a corresponding duration information for media access in the received media access request message.

19 Claims, 4 Drawing Sheets

(56) References Cited

U.S. PATENT DOCUMENTS

| | | | |
|---|---|---|---|
| 2003/0125087 A1* | 7/2003 | Shimizu | 455/561 |
| 2003/0128684 A1* | 7/2003 | Hirsch et al. | 370/338 |
| 2004/0117497 A1* | 6/2004 | Park | 709/230 |
| 2004/0218620 A1* | 11/2004 | Palm et al. | 370/445 |
| 2005/0210157 A1* | 9/2005 | Sakoda | 709/251 |
| 2005/0270975 A1* | 12/2005 | Meylan et al. | 370/229 |
| 2006/0034219 A1* | 2/2006 | Gu et al. | 370/329 |
| 2006/0092967 A1* | 5/2006 | Bergeron et al. | 370/463 |
| 2006/0099990 A1* | 5/2006 | Chau et al. | 455/558 |
| 2006/0114826 A1 | 6/2006 | Brommer | |
| 2009/0103501 A1* | 4/2009 | Farrag et al. | 370/337 |

FOREIGN PATENT DOCUMENTS

| | | | |
|---|---|---|---|
| GB | 2 443 962 A | 5/2008 | |
| JP | 2006108966 | 4/2006 | |
| KR | 20040047425 | 6/2004 | |
| WO | WO03040866 | 5/2003 | |

OTHER PUBLICATIONS

Grilo A et al.: "Performance evaluation of IEEE 802, 11E" Personal, Indoor and Mobile Radio Communications, 2002, The 13th IEEE International Symposium on Sept. 15-18, 2002, Piscataway, NJ, USA IEEE International Symposium on Sept. 15-18, 2002, Piscataway, NJ USA, IEEE, vol. 1, Sep. 15, 2002, pp. 511-517, XP010614277 ISBN: 978-0-7803-7579-5.

European Search Report dated Aug. 18, 2008.

* cited by examiner

ACCESSING A COMMUNICATION MEDIA USING BOTH A CONTENTION PERIOD AND A POLLING PERIOD This application claims the benefit, under 35 U.S.C. §119 of European Patent Application 08305334.8, filed Jun. 26, 2008.

FIELD OF THE INVENTION

The present invention relates in general to an access point device, a communication device and a method for data transmission between the access point and the communication device, and more particularly, to an access point, a communication device and a method for access to communication media in a broadband bidirectional data transmission network.

BACKGROUND OF THE INVENTION

In a communication system, data transmission between access point and multiple stations has to be controlled to avoid conflicts between multiple concurrent transmissions. In general, this control is addressed through the medium access control (MAC) layer of a communication protocol.

A kind of MAC layer transmission control technology is called as Distributed Coordination Function (DCF), which employs a carrier sense multiple access/collision avoid (CSMA/CA) distributed algorithm. In some wireless systems using DCF, a wireless device that has data to transmit first listens to the medium to detect whether any other wireless device is currently transmitting. If another device is already transmitting, the original wireless device will not begin transmitting. However, if the device does not detect any other wireless device transmitting, the device will begin its own transmission.

Another transmission control technology is called as Point Coordination Function (PCF), which controls access to the medium using the infrastructure network configuration. In an infrastructure network configuration, an access point controls a basic service set and provides a connection to a larger network. To implement the PCF, an access point takes control of the medium in response to polling the connected stations.

Recently, the high potential provided by wire-line broadband access technology in bidirectional data transmission has been fully recognized, and more and more wire-line network technology has been developed and utilized. A kind of cost-effective bi-directional data transmission solution over the existing coaxial cable access network is called as ADoC (Asymmetric Data over Coaxial Cable) system. Since the signal transmission environment and network architecture for the ADoC system is quite different with that in wireless scenario, the conventional MAC layer mechanism DCF or PCF does not enjoy an acceptable performance.

SUMMARY OF THE INVENTION

According to one aspect of the invention, provide an access point device for controlling access to a communication media in a communication network, comprising: a communication interface for exchanging data with a plurality of communication units in the communication network via the communication media; and a processor for receiving a media access request message in a contention mode from at least one communication unit of the plurality of communication units via the communication interface; and polling the at least one communication unit by assigning a media access duration to each of the at least one communication unit according to a corresponding duration information for media access in the received media access request message.

The invention also concerns a method used in an access point device for controlling access to a communication media in a communication network, comprising: receiving a media access request message in a contention mode from at least one communication unit of a plurality of communication units in the communication network; and polling the at least one communication unit by assigning a media access duration to each of the at least one communication unit according to a corresponding duration information in the received media access request message.

The invention also concerns a communication unit for access to a communication media in a communication network, comprising: a communication interface for exchanging data with an access point device in the communication network via the communication media; and a processor for sending, in a contention mode, a media access request message including a requested media access duration to the access point device via the communication interface; and accessing the communication media via the communication interface during an assigned media access duration in response to polling of the AP according to the requested media access duration in the media access request message.

The invention also concerns a method used in a communication unit for access to a communication media in a communication network, comprising: sending, in a contention mode, a media access request message including a requested media access duration to the access point device via the communication network; and accessing the communication media during an assigned media access duration in response to polling of the AP according to the requested media access duration in the media access request message.

BRIEF DESCRIPTION OF DRAWINGS

These and other aspects, features and advantages of the present invention will become apparent from the following description in connection with the accompanying drawings.

DETAIL DESCRIPTION OF PREFERRED EMBODIMENTS

A description will now be given with reference to attached figures to illustrate many advantages/features of the present invention, according to various illustrative embodiments of the present invention.

Figure 1:
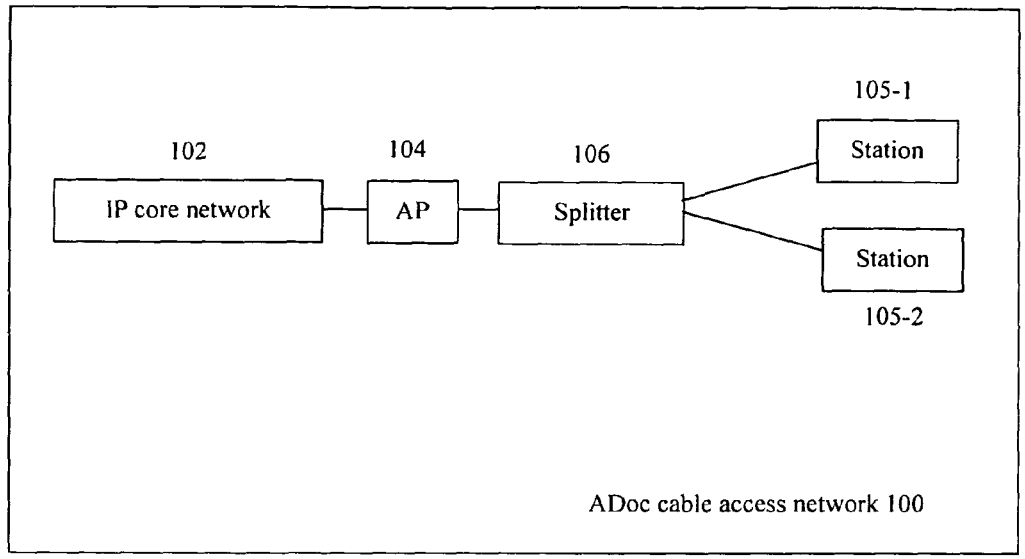
FIG. 1 is a schematic diagram showing an ADoC cable access network used to explain an embodiment of the invention.

FIG. 1 is a schematic diagram showing an ADoC cable access network 100 used to explain an embodiment of the invention. As shown in FIG. 1, an access point (AP) 104 and a plurality of stations for example 105-1 and 105-2 are connected via splitters 106, and the AP 104 is connected with an IP core network 102. Therefore, users at home can access to the remote IP core network 102 via a cable connection of the ADoC network by the stations.

Figure 2:
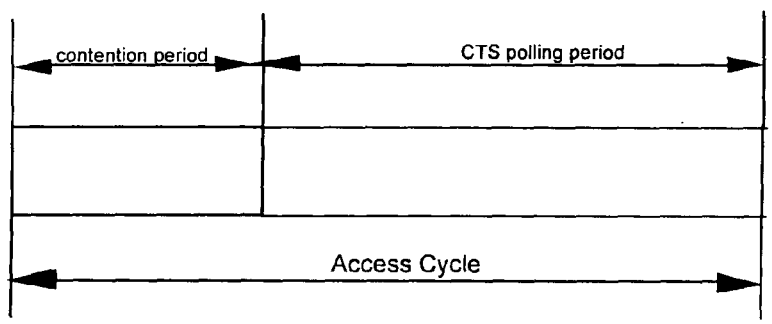
FIG. 2 is a diagram showing a access cycle used for media access between AP and stations according to the embodiment of the invention.

FIG. 2 is a diagram showing a access cycle used for media access between AP and stations in the embodiment of the invention, wherein the access cycle is divided into two periods including a contention period and a polling period which are used by the AP to control access to the communication media.

The contention period is in the beginning of every access cycle, and is used to allow new stations to complete authentication and association with the AP and to allow the associated stations to notify the AP that it has incoming frames to send. The data transmission during the contention period is performed in a contention mode because a station can not detect if other stations are accessing the media and sending frames, and there is no negotiation with other stations and AP before the frames transmission. On the other hand, since only request and respond messages are transmitted during the contention period, the contention between data transmission will be reduced. The polling period follows the contention period, and is used by the AP to poll the stations.

During both of the periods, the AP may send a Clear To Send (CTS) message to inform the indicated stations to access the media so as to complete the access cycle. The CTS message includes a destination address field, which can be used to reserve transmission medium to transmit data only for the station whose MAC address is as same as the destination address in this message, while other stations will stop data transmission. Generally, the destination address can be a MAC address of a station, a MAC address of a group of stations, or a special broadcast address which will reserve the media to all stations.

Figure 3:
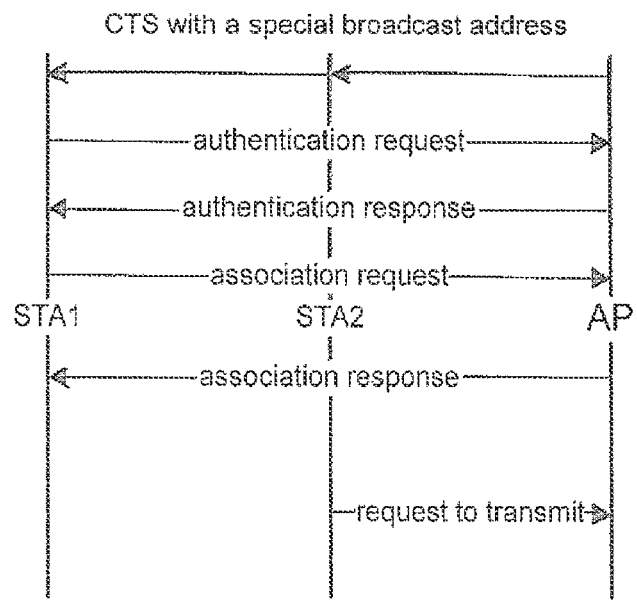
FIG. 3 is a diagram showing a signaling procedure flow during a contention period between AP and stations according to the embodiment of the invention.

FIG. 3 is a diagram showing a signaling procedure flow during contention period between AP and stations according to the embodiment of the invention. In the beginning of the contention period, the AP sends a CTS message which includes a special broadcast address as shown in FIG. 3. In the present embodiment, the special broadcast address is set as an address that all bits in the destination address field of the CTS message are set to 1. All stations receiving the CTS message with the special broadcast address, such as STA1 and STA2, can access the media currently. In addition, the CTS message includes a duration field which is the duration of the contention period. Therefore, the CTS message can be interpreted as reserving media for all stations during the contention period. The all stations include stations that connect with AP via cable connection and can receive the CTS message. Among these stations, some have been associated with the AP and some have not.

According to the embodiment of the invention, the un-associated stations that intend to associate with the AP shall go through an authentication and an association steps during the contention period. As shown in FIG. 3, STA1 and STA2 are two un-associated stations, and they send an authentication request message to the AP after receiving the CTS, to establish an identity of the station as a member of a set of stations authorized to associate with the AP. Then the AP will give an authentication response to STA1.

After the authentication response, the STA1 and STA2 send an association request message to the AP, so that the network system tracks the location of each station, and the frames destined for the station can be forwarded to the correct AP. The AP will reply with an association response message to the stations.

After the authentication and association is completed, the stations may request to transmit their buffered frames to the AP. In addition, other stations which have been associated with the AP in the beginning of the contention period may request to transmit their buffered frames at any time of this period. For those stations that have no MAC frames in their buffer to be transmitted to the AP, they do not need to send the transmission request message.

Here, a Request to Transmit (RTT) message is used to make the media access request, and contain the requested duration to send the MAC frames in its buffer with the current physical layer data rate. Therefore, the stations shall firstly calculate the needed duration based on the known physical layer data rate and the amount of the buffered frames therein that intend to transmit via the communication media, and then add this duration into a duration field of the RTT message.

Figure 4:
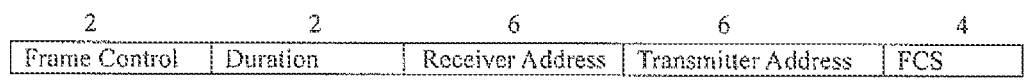
FIG. 4 is a diagram showing a Request To Transmit (RTT) frame structure according to the embodiment of the invention.

FIG. 4 is a diagram showing a RTT frame structure according to the embodiment of the present invention. The detailed definition for each field in the RTT frame is as follows:

Frame control field: it is a 2 byte long field and consists of information such as protocol version, type, retry and power management.

Duration field: it is a 2 byte long field, and indicates how long it will take to transmit the MAC frames in the station's buffer with the current physical layer data rate. The duration is used to update a transmission duration field for this station in a polling list at the AP side. The polling list and procedure of AP will be explained in detail later.

Receiver address field: it is a 6 byte long field and contains the destination AP's MAC address.

Transmitter address field: it is a 6 byte long field and contains a MAC address of the station which sends this RTT message.

FCS field: it is a 4 byte long field and contains a 32-bit Cyclic Redundancy Code (CRC) value.

In order to poll the stations during a polling period of an access cycle, the AP maintains a polling list, in which there are two fields: MAC address field and corresponding transmission duration field. The MAC address field includes the associated stations' MAC address as an identifier of the stations. When a station has been successfully authenticated and associated, its MAC address will be added into the polling list's MAC address field and its corresponding transmission duration field will be assigned as a default value 0. When the AP has successfully received a RTT message from an associated station, it will update the transmission duration field for this station in the polling list with the value in the duration information in this RTT message.

In addition, the MAC address field includes the AP's MAC address and corresponding transmission duration, and the AP may update transmission duration field for itself with the estimated time to transmit MAC frames in its buffer, using the current physical layer data rate during contention period of every access cycle.

The Polling Period begins at the end of the Contention Period as shown in FIG. 2, and provides transmission opportunities for frame transfer in a contention free mode. During the Polling Period, the access to the media is completely controlled by the AP, so that contention between data transmission of the stations and AP can be avoided. According to the embodiment of the invention, the AP will poll the AP and stations which have a non-zero duration field in the polling list by sending CTS frame, that is, those stations and AP have sent a RTT message during the contention period. For the AP and those stations in the polling list without transmission duration, no polling period will be arranged. The AP will poll the AP and stations by assigning media access duration to each of the stations according to corresponding duration information in the received media access request message.

For example, when the CTS frame sent by the AP includes a MAC address of the AP as destination address and a specific time as media access duration, all stations will receive the CTS message and wait for the data transmission of AP. When the CTS frame includes a MAC address of a station as destination address and a specific time as media access duration, all stations will receive the CTS message and just the indicated station can send data via the transmission media, while the AP will also wait for a period of the specific time to poll the next station.

Here, the specific time as the media access duration can be equal to or less than the duration indicated in the RTT message when considering the duration of polling period. The AP may poll some of the stations in an access cycle, and poll other stations in another access cycle. At this time, the stations have not been polled do not need to send a RTT message again.

Figure 5:
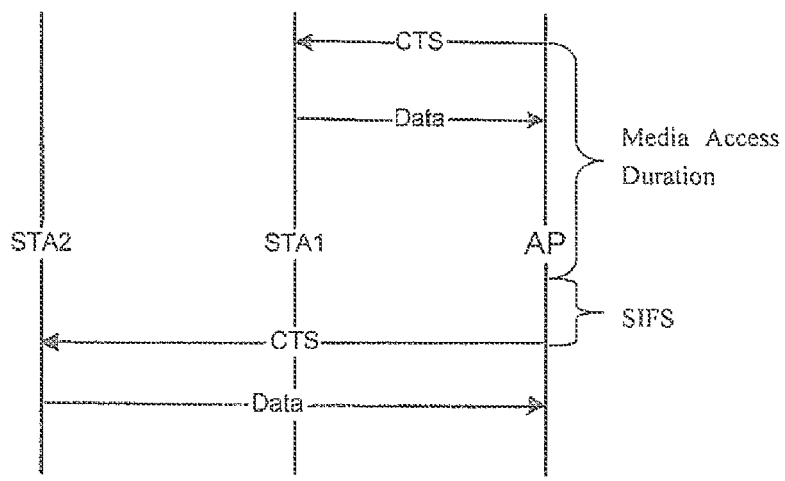
FIG. 5 is a diagram showing a signaling procedure flow during a polling period between AP and stations according to the embodiment of the invention.

FIG. 5 is a diagram showing a signaling procedure flow during polling period between AP and stations according to the embodiment of the invention. As shown in FIG. 5, AP sends CTS message to poll each station respectively in a predetermined order, and assigns its duration field according to the corresponding transmission duration filed in the polling list. Furthermore, the polled station may access the medium and sends out data during the period indicated in the CTS message. Here, the AP sends CTS frame to poll the stations and AP within an interval shorter than or equal to SIFS (short interframe space) after the previous specific time assigned to the polled AP and STA. By waiting a period shorter than or equal to SIFS, it ensures that the AP will always gain the control for the media channel after data frame transmission between AP and station, because stations with the fastest possible speed will only be able to control the channel after SIFS interval after the previous specific time according to the existing specification.

Figure 6:
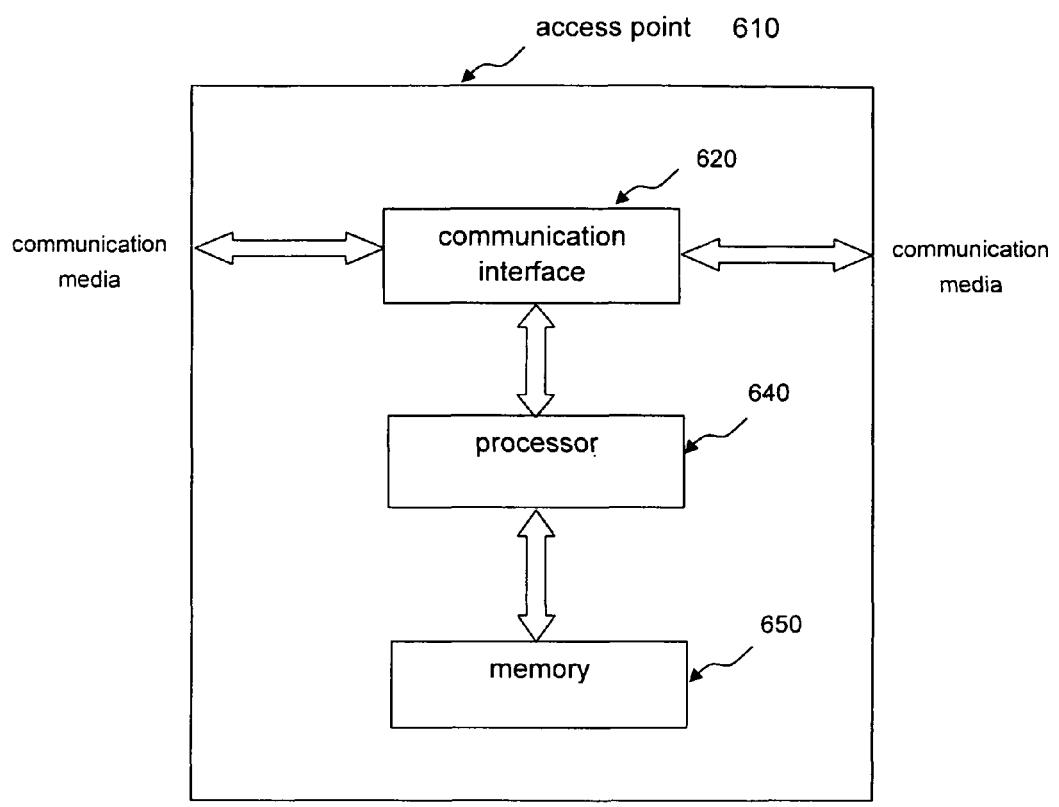
FIG. 6 is an exemplary configuration of an access point in accordance with the embodiment of the invention.

FIG. 6 is an exemplary configuration of an access point in accordance with the embodiments of the invention. The AP 610 makes a control based on the media access cycle shown in FIG. 2, and comprises a communication interface 620 for handling communication with other portions of the ADoC network such as the IP core network in FIG. 1 and exchanging data with a plurality of communication units such as STA1 and STA2 in the communication network via the communication media, and a processor 640 coupled with the communication interface 620 for processing data and for controlling the communication interface 620, so as to control the communication interface to exchange data based on the above embodiments.

The AP 610 also includes a memory 650 for storing the buffered frames, the above-mentioned polling list, and executable instructions and data for programming the processor 640 according to the present invention. It will be appreciated that the communication interface 620, the processor 640, and the memory 650 can be combined in whole or in part and fabricated as an integrated circuit.

As mentioned above, in the beginning of the contention period, the AP 610 sends a CTS message to inform the stations to access the media via the communication interface 620. Then, the AP 610 receives request message of authentication, association and RTT in a contention mode, and authenticates and associates the stations according to the procedure flow shown in FIG. 3 then updates the polling list stored in the memory 650, and adds transmission duration for the corresponding stations. During the polling period, the AP 610 polls the plurality of communication units via the communication interface 620 according to the duration in the received request message, so that the plurality communication units send data to the AP 610 via the communication media respectively.

Figure 7:
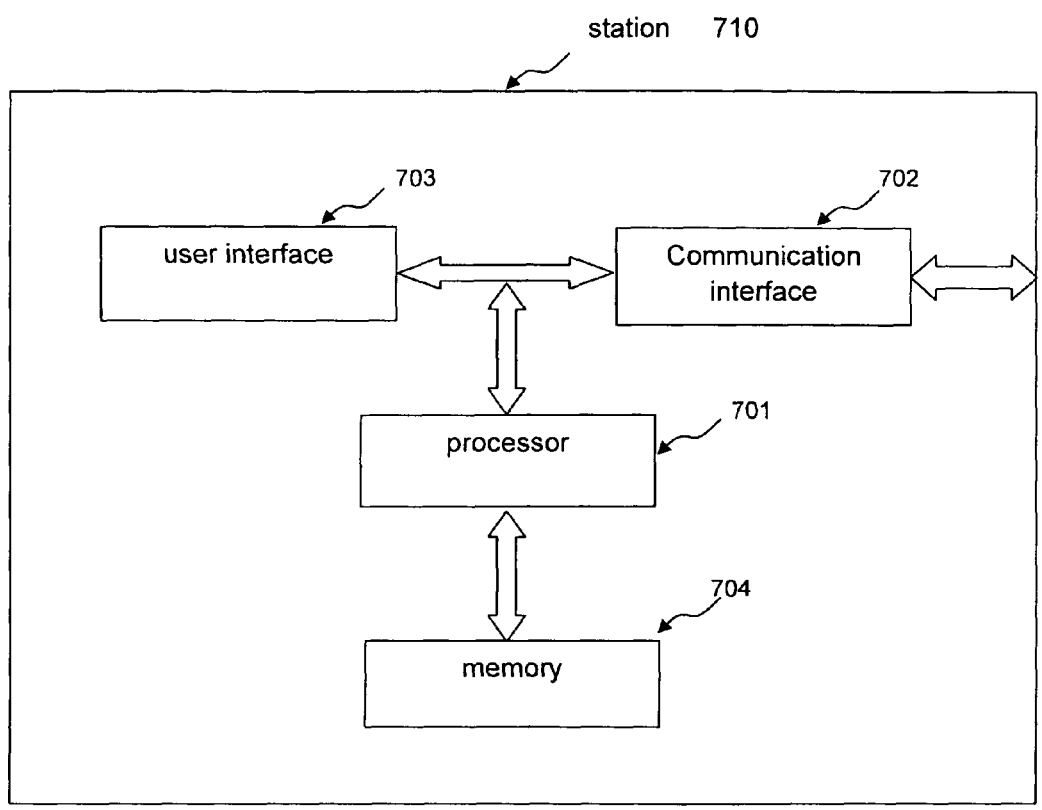
FIG. 7 is an exemplary configuration of a communication unit in accordance with the embodiment of the invention.

FIG. 7 is an exemplary configuration of a station in accordance with the embodiments of the invention. The station 710 comprises a processor 701 for controlling a communication interface 702 coupled to the processor 701 for communicating with the AP 610, a user interface 703 comprising well-known elements, such as a keypad, a display, and audio transducers etc. In addition, the station 710 includes a memory 704 coupled to the processor 701 comprising buffered frames, and executable instructions and data for programming the processor 701 in accordance with the present invention. It will be appreciated that the processor 701, the communication interface 702, and the memory 704 can be combined in whole or in part and fabricated as an integrated circuit.

As mentioned above, the station 710 controls the communication interface 702 so as to be associated with the AP 610 and send RTT message to the AP 610 during the contention period, and send the buffered frames in memory 704 by the polling of the AP 610 during the polling period.

Although the embodiment of the invention is described based on an ADoC system, the man skilled in the art may adapt the invention to other communication network environments using the process for the access cycle with a contention period and a polling period.

The foregoing merely illustrates the embodiment of the invention and it will thus be appreciated that those skilled in the art will be able to devise numerous alternative arrangements which, although not explicitly described herein, embody the principles of the invention and are within its spirit and scope.

The invention claimed is:

1. An access point device for controlling access to a communication media in a wired communication network, comprising:
    a communication interface for exchanging data with a plurality of communication units in the wired communication network via the communication media; and
    a processor for receiving only authentication request messages from unassociated ones of the plurality of communication units and a media access request and respond messages in a contention mode from ones of the plurality of communication units having data to transmit via the communication interface, the received media access request and respond messages including data indicating a media access duration; determining a value representative of a media access duration for each of the plurality of communication units from which a media access request and respond message is received based on the media access duration received with the media access request and respond message; and polling the plurality of communication units during a polling period by assigning the media access duration to each of the plurality of communication units according to the media access duration in the media access request and respond message received in the contention mode and transmitting a clear to send frame to communication units from which media access request and respond messages have been received, wherein the clear to send frame includes a determined media access duration and a MAC address of a communication unit authorized to send data.

2. The access point device according to claim 1, wherein the processor controls a media access cycle including a contention period and a polling period, and to receive the media access request message during the contention period and to poll the at least one communication unit during the polling period.

3. The access point device according to claim 2, wherein the processor polls each communication unit within a short interframe space after passing a media access duration assigned to a previous polled communication unit.

4. The access point device according to claim 2, further comprising a memory for storing a polling list which includes an identifier of the at least one communication unit and the corresponding duration information.

5. The access point device according to claim 4, wherein the communication network is a cable network.

6. The access point device according to claim 1, wherein the processor polls each communication unit within a short interframe space after passing a media access duration assigned to a previous polled communication unit.

7. The access point device according to claim 1, wherein the communication network is an Asymmetric Data over Coaxial Cable System.

8. The access point device according to claim 1, wherein the processor of the access point sends the Clear to Send frame to poll communication units within an interval shorter than or equal to a short interframe space after a previous specific time assigned to the polled communication unit.

9. The access point device according to claim 1, wherein the determined value representative of a media access duration for each of the at least one of the plurality of communication units is less than a requested value received with the media access request and respond message.

10. A method used in an access point device for controlling access to a communication media in a wired communication network including a plurality of communication units, comprising:
    receiving only authentication request messages from unassociated ones of the plurality of communication units and media access request and respond messages in a contention mode from ones of the plurality of communication units having data to transmit, the received media access request and respond messages including data indicating a media access duration;
    determining a value representative of a media access duration for each of the plurality of communication units from which a media access request and respond message is received based on the media access duration received with the media access request and respond message; and
    polling the plurality of communication units during a polling period by assigning the media access duration to each of the plurality of communication units according to the media access duration in the media access request and respond messages received in the contention mode, and transmitting a clear to send frame to communication units from which media access request and respond messages have been received, wherein the clear to send frame includes a determined media access duration and a MAC address of a communication unit authorized to send data.

11. The method according to claim 10, wherein the media access request message is received during a contention period of a media access cycle, and the polling of the at least one communication unit is carried out during a polling period of the media access cycle.

12. The method according to claim 11, wherein polling includes polling each communication unit within a short interframe space after passing a media access duration assigned to a previous polled communication unit.

13. The method according to claim 11, wherein authenticating and associating the plurality of communication units to the communication network before receiving the media access request message.

14. The method according to claim 13, wherein the communication network is a cable network.

15. The method according to claim 10, wherein polling includes polling each communication unit within a short interframe space after passing a media access duration assigned to a previous polled communication unit.

16. A communication unit for access to a communication media in a wired communication network, comprising:
    a communication interface for exchanging data with an access point device in the wired communication network via the communication media; and
    a processor for calculating a needed media access duration; sending, in a contention mode, only a media access request and respond message including media access request with a requested media access duration based on the calculated needed media access duration, to the access point device via the communication interface; receiving a clear to send frame from the access point device including a determined media access duration and a MAC address of a communication unit authorized to send data; and, when the MAC address in the clear to send frame matches the MAC address of the communication unit, accessing the communication media via the communication interface during an assigned media access duration during a polling period in response to polling of the access point according to the requested media access duration in the media access request message, a duration of the polling period being set by the access point device in response to received media access request and respond messages from each communication unit within the wired communication network.

17. The communication unit according to claim 16, wherein the processor sends the media access request message during a contention period and to access the communication media in response to polling of the access point device during a polling period.

18. A method used in a communication unit for access to a communication media in a wired communication network, comprising:
    calculating a needed media access duration; sending, in a contention mode, only a media access request and respond message including a media access request message with a requested media access duration based on the calculated needed media access duration, to an access point device via the wired communication network;
    receiving a clear to send frame from the access point device including a determined media access duration and a MAC address of a communication unit authorized to send data; and
    when the MAC address in the clear to send frame matches the MAC address of the communication unit, accessing the communication media during an assigned media access duration during a polling period in response to polling of the access point device according to the requested media access duration in the media access request message, a duration of the polling period being set by the access point device in response to received media access request and respond messages from each communication unit within the wired communication network.

19. The method according to claim 18, wherein sending the media access request message during a contention period and accessing the communication media in response to polling of the access point device during a polling period.

* * * * *